(12) United States Patent
Vetesnik

(10) Patent No.: US 9,737,739 B2
(45) Date of Patent: Aug. 22, 2017

(54) FALL PROTECTION APPARATUS

(71) Applicant: Tuffbuilt Products Inc., Winnipeg (CA)

(72) Inventor: Jan Vetesnik, Winnipeg (CA)

(73) Assignee: Tuffbuilt Products Inc., Winnipeg, MB (CA)

( * ) Notice: Subject to any disclaimer, the term of this patent is extended or adjusted under 35 U.S.C. 154(b) by 0 days.

(21) Appl. No.: 14/847,614

(22) Filed: Sep. 8, 2015

(65) Prior Publication Data

US 2016/0375280 A1 Dec. 29, 2016

Related U.S. Application Data

(60) Provisional application No. 62/183,964, filed on Jun. 24, 2015.

(51) Int. Cl.
| | | |
|---|---|---|
| *F16M 11/42* | (2006.01) | |
| *A62B 35/00* | (2006.01) | |
| *E04G 21/32* | (2006.01) | |
| *F16M 11/18* | (2006.01) | |
| *F16M 11/20* | (2006.01) | |

(Continued)

(52) U.S. Cl.
CPC ...... *A62B 35/0068* (2013.01); *A62B 35/0006* (2013.01); *E04G 21/3204* (2013.01); *E04G 21/3261* (2013.01); *E04H 12/182* (2013.01); *E04H 12/34* (2013.01); *F16M 11/18* (2013.01); *F16M 11/2021* (2013.01); *F16M 11/28* (2013.01); *F16M 11/42* (2013.01)

(58) Field of Classification Search
CPC .............. E04G 21/329; E04G 21/3204; E04G 21/3261; F16M 11/28; F16M 11/18; F16M 11/42; F16M 11/2021; A62B 35/0068; A62B 35/0006; E04H 12/182; E04H 12/34

USPC .................................. 52/111, 116, 119, 121
See application file for complete search history.

(56) References Cited

U.S. PATENT DOCUMENTS 2,571,858 A * 10/1951 Garland .................. B66C 23/36
212/231
3,638,806 A 2/1972 Hippach
(Continued)

FOREIGN PATENT DOCUMENTS

| CA | 2765986 A1 * | 7/2012 | ......... A62B 35/0068 |
|---|---|---|---|
| GB | 160027 | 12/1919 | |

(Continued)

*Primary Examiner* — Babajide Demuren
(74) *Attorney, Agent, or Firm* — Adrian D. Battison; Ade & Company Inc

(57) ABSTRACT

A fall protection apparatus includes a heavy support base with a pivotal mast having a top member for rotation around the axis of the mast carrying a series of booms pivotal about respective vertical axes, each having an end coupling member for receiving a fall restraint harness. Each boom is formed by a tube which fractures on a fall and an elongate stainless steel strap inside the tube which bends without fracturing. The mast includes a series of telescopic rectangular mast sections with a winch driven cable and pulley arrangement for extending the first section which acts to pull the second inner section to the extended position as the first inner section moves out of the outer section. Each section includes first and second pulleys mounted at the same face of the section with the cable located between the face of the section and the face of the next section.

22 Claims, 7 Drawing Sheets

(51) Int. Cl.
*F16M 11/28* (2006.01)
*E04H 12/18* (2006.01)
*E04H 12/34* (2006.01)

(56) References Cited

U.S. PATENT DOCUMENTS

| | | | | |
|---|---|---|---|---|
| 3,694,829 | A * | 10/1972 | Bakker | A61G 7/1017 5/86.1 |
| 4,600,348 | A * | 7/1986 | Pettit | E04F 21/1822 254/3 C |
| 4,932,176 | A * | 6/1990 | Roberts et al. | E04H 12/182 182/148 |
| 5,163,650 | A * | 11/1992 | Adams et al. | B60Q 1/2657 248/354.4 |
| 5,615,855 | A * | 4/1997 | Marue et al. | B60P 3/18 248/188.5 |
| 6,202,868 | B1 * | 3/2001 | Murray | A22B 5/06 212/227 |
| 6,401,863 | B1 * | 6/2002 | Kirkland | B66D 3/26 182/142 |
| 6,685,146 | B1 * | 2/2004 | Sanchez, Jr. | F16M 11/14 248/125.7 |
| 6,978,974 | B1 * | 12/2005 | Marasco | A63H 17/12 248/124.1 |
| 7,537,085 | B2 * | 5/2009 | Vetesnik | A62B 35/0068 182/3 |
| 8,025,125 | B2 * | 9/2011 | Vetesnik et al. | A62B 1/04 182/3 |
| 2010/0126801 | A1 * | 5/2010 | Begin et al. | A62B 35/0056 182/3 |
| 2011/0016628 | A1 * | 1/2011 | Masterson, Jr. | A61G 7/1015 5/87.1 |
| 2012/0319064 | A1 * | 12/2012 | Selkowitz | B66C 23/48 254/323 |
| 2014/0008511 | A1 * | 1/2014 | Xammar Bove | A62B 35/04 248/636 |
| 2015/0023017 | A1 * | 1/2015 | Smith et al. | F21V 21/22 362/249.03 |
| 2015/0360063 | A1 * | 12/2015 | Meyer et al. | A62B 35/0068 248/636 |
| 2015/0361686 | A1 * | 12/2015 | Vetesnik | E04H 12/2269 182/9 |

FOREIGN PATENT DOCUMENTS

| | | | |
|---|---|---|---|
| GB | 2497921 | 9/2011 | |
| NL | 1003089 C2 * | 11/1997 | E04H 12/187 |
| WO | WO 8702257 A1 * | 4/1987 | A62B 35/04 |

* cited by examiner

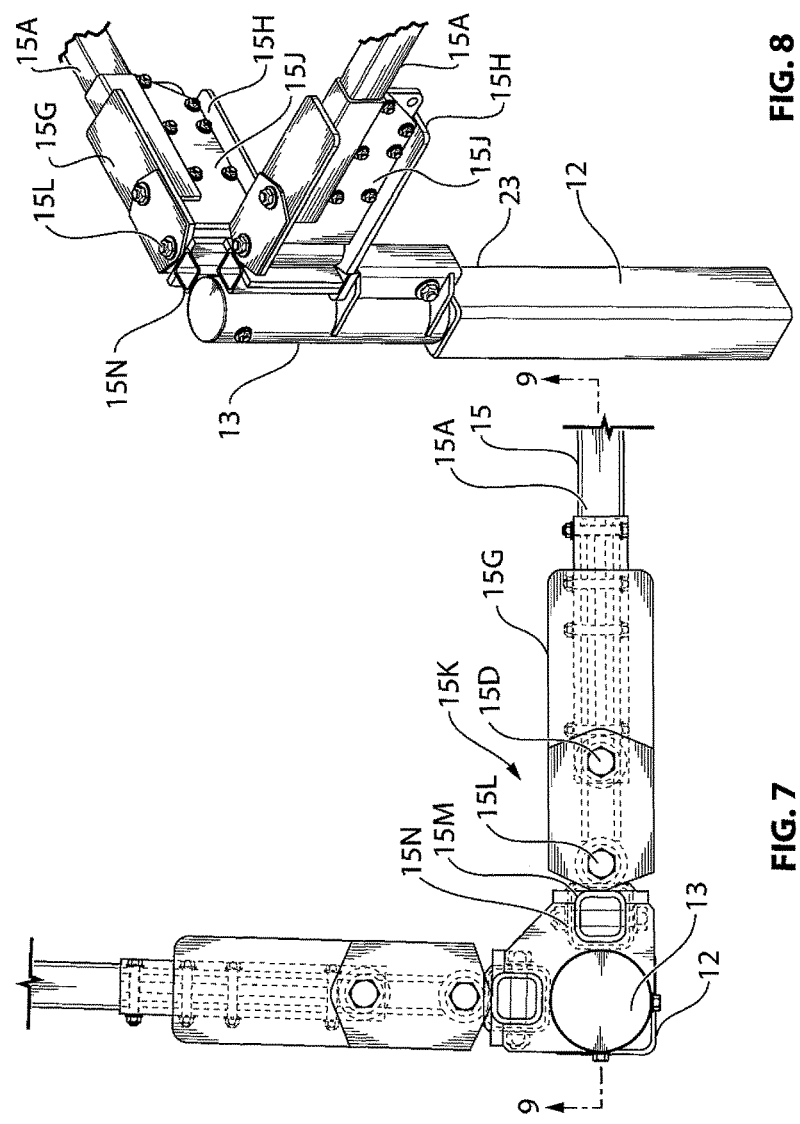

FALL PROTECTION APPARATUS

This application claims the benefit under 35 USC 119 (e) of provisional application 62/183,964 filed Jun. 24, 2015.

This invention relates to a fall protection device where a mast is mounted on a support base and carries a boom at the upper end onto which a fall restraint harness can be mounted.

BACKGROUND OF THE INVENTION

Various telescopic masts are provided in the prior art where the mast includes a series of tubular sections arranged one inside the next and slidable from a contracted state to an extended state, including the following:

GB2497921 shows an arrangement with a main cable 18 which elevates the second section relative to the main first outer section and then uses a second cable 23 to elevate the third section.

U.S. Pat. No. 3,638,806 shows in FIG. 4 an elevation scheme basically the same as above so that each section is elevated by movement of its next adjacent section by a cable connected between the two.

GB160027 also has two separate cables 10 and 10A with the cable 10A acting to lift the third section as the second section is lifted.

SUMMARY OF THE INVENTION

According to a first aspect of the invention, there is provided a fall protection apparatus comprising:
 a support base;
 a top support member mounted on a top of the mast
 at least one boom attached to the support member and extending outwardly to one side of the mast;
 and a coupling member attached to the boom at the end of the boom for receiving a fall restraint harness of a worker;
  the boom comprising:
  a tube attached to the support member at an inner end and attached to the coupling member at an outer end;
  the tube being arranged so that it fractures on application of a load applied by a fall to the coupling member causing bending of the tube;
  and an elongate member located inside the tube and attached to the support member at an inner end and attached to the coupling member at an outer end;
  the elongate member being arranged so that it bends without fracturing on fracture of the tube by application of said load applied by a fall to the coupling member.

Preferably the elongate member is a strap. However other shapes of the elongate member can be used including potentially a cable.

Preferably the elongate member in the form of a flat solid strap of metal has a width substantially equal to a transverse interior width of the tube.

Preferably the elongate member is stainless steel which has the ability to bend with predetermined characteristics without the risk of fracture. In this way the tube can be designed to fracture under the load and therefore the boom collapses inwardly toward the mast so that the distance of the coupling to which the harness is attached from the mast reduces to reduce the side load on the mast caused by the fall. In this way total loading on the mast can be reduced so that the dimensions of the mast and the support for the mast can be reduced.

Preferably the tube is of rectangular cross-section and the elongate member in the form of the flat strap is located in the tube at a bottom wall of the tube.

It is of course necessary that the elongate member in the form of the strap remains connected to the mast at the inner end and to the coupling at the outer end to maintain continuity when the tube fractures. Thus preferably the tube is fastened to the support member by a pin passing through transverse holes in the tube and wherein the elongate member includes a hole therethrough by which the elongate member is connected to the pin. In order to maintain this continuity, as additional wire cable may be attached along the tube on the exterior or on the interior so that in effect the cable from the harness to the coupling is continued right up to the mast by the additional cable. There is therefore no danger of the harness being disconnected from the mast on the shock loading from a fall even though the worker will fall an additional distance defined by the length of the boom as he boom collapses.

Preferably the support member includes an elongate mounting member inserted into a top end of the mast.

Preferably the elongate mounting member carries a plurality of upstanding receptacles at spaced positions therearound each for receiving a respective insert member of a respective one of the plurality of booms.

Preferably each boom includes a swivel coupling for limited side to side pivotal movement of the boom relative to the elongate mounting member about an axis parallel to an upstanding axis of the mast so that this side to side movement is combined with the free rotation of the insert member into the upper end of the mast.

Preferably the top support member is removable.

Preferably there is provided a first bracket member attaching the outer section of the mast to the support base for pivotal movement about a horizontal axis transverse to the mast and an actuator attached to the support base for moving the mast between a horizontal stored position across the support base to an erected position standing upwardly from the support base.

Preferably the support base comprises a rectangular body filled with a ballast material and wherein the first bracket member is mounted on one upstanding side wall of the body.

According to a second aspect of the invention there is provided a fall protection apparatus comprising:
 a support base;
 a mast mounted on the base so as to stand upwardly therefrom;
 a top support member mounted on a top of the mast
 at least one boom attached to the support member and extending outwardly to one side of the mast;
 and a coupling member attached to the boom at the end of the boom for receiving a fall restraint harness of a worker;
  the boom comprising:
  a tube attached to the support member at an inner end and attached to the coupling member at an outer end;
  the tube being arranged so that it fractures on application of a load applied by a fall to the coupling member causing bending of the tube;
  and an elongate member located inside the tube and attached to the support member at an inner end and attached to the coupling member at an outer end;
  the elongate member being arranged so that it bends without fracturing on fracture of the tube by application of said load applied by a fall to the coupling member.

According to a third aspect of the invention there is provided a fall protection system comprising:

a support base;
a telescopic mast comprising:
a plurality of tubular mast sections including an outer section, a first inner section slidable longitudinally within the outer section and a second inner section slidable longitudinally within the first inner section;
the sections being slidable from a retracted position where the first and second inner sections are at least partly within the outer section to an extended position;
a drive arrangement for causing said sliding movement of the first inner section longitudinally of the outer section to the extended position thereof;
and a cable and pulley arrangement for causing the movement of the first inner section to the extended position to be communicated to the second inner section to cause said sliding movement of the second inner section longitudinally of the first inner section to the extended position thereof;
a top support member mounted on a top of the mast
a plurality of booms each carried on the support member and extending outwardly to one side of the mast;
and an attachment at the end of the boom for receiving a fall restraint harness of a worker;
wherein the top support member includes an elongate mounting member inserted into a top end of the mast;
wherein the elongate mounting member carries a plurality of upstanding receptacles at spaced positions therearound each for receiving a respective insert member of a respective one of a plurality of booms;
and wherein each boom includes a swivel coupling for limited side to side pivotal movement of the boom relative to the elongate mounting member about an axis parallel to an upstanding axis of the mast.

The invention is preferably used with a telescopic mast comprising:
a plurality of tubular mast sections including an outer section, a first inner section slidable longitudinally within the outer section and a second inner section slidable longitudinally within the first inner section;
each of the sections having a rectangular cross-section so that each has first, second, third and fourth faces parallel to and immediately adjacent respective first, second, third and fourth faces of each of the other sections;
the sections being slidable from a retracted position where the first and second inner sections are at least partly within the outer section to an extended position;
a drive arrangement for causing said sliding movement of the first inner section longitudinally of the outer section to the extended position thereof;
and a cable and pulley arrangement for causing the movement of the first inner section to the extended position to be communicated to the second inner section to cause said sliding movement of the second inner section longitudinally of the first inner section to the extended position thereof;
the cable and pulley arrangement including a first and a second pulley each mounted on the first inner section and a cable arrangement connected at one end to the outer section and at an opposed end to the second inner section so as to pull the second inner section to the extended position as the first inner section moves out of the outer section;
the first and second pulleys being mounted at the first face of the first inner section with the cable arrangement including first and second cable lengths each wrapped around a respective one of the first and second pulleys and extending along the first face of the second inner section between the first face of the second inner section and the first face of the first inner section.

Preferably the first and second pulleys are parallel and at right angles to the first face of the first inner section. This allows the first and second pulleys to be mounted beyond an end of the first inner section on a collar attached to an end of the first inner section.

Preferably there is a third inner section inside the second inner section and a second cable and pulley arrangement for causing the movement of the second inner section to the extended position to be communicated to the third inner section to cause said sliding movement of the third inner section longitudinally of the second inner section to the extended position thereof, the second cable and pulley arrangement including a third and a fourth pulley each mounted on the second inner section and a cable arrangement connected at one end to the first inner section and at an opposed end to the third inner section so as to pull the third inner section to the extended position as the second inner section moves out of the first inner section; wherein the third and fourth pulleys are mounted at the third face of the second inner section with the cable arrangement including first and second cable lengths each wrapped around a respective one of the third and fourth pulleys and extending along the third face of the third inner section between the third face of the third inner section and the third face of the second inner section. Thus the third and fourth pulleys are mounted on a side of the rectangular mast opposite to the first and second pulleys so that the construction can collapse to a reduce length. Symmetrically the pulleys of further sections or of the outer section can be arranged at alternate sides of the mast to allow better interleaving of the structure when collapsed.

Preferably the first and second cable lengths are mounted at the bottom of the second inner section by a mounting member which allows transfer of loads between the first and second cable lengths.

Preferably the mounting member which allows transfer of loads between the first and second cable lengths comprises an arcuate disk member or part of a disk member carried on the first face of the second inner section for pivotal movement about an axis thereof at right angles to the first face with the cable lengths wrapped wound an outer periphery of the arcuate disk member.

Preferably the arcuate disk member is arranged to trap the cable lengths to prevent escape therefrom. Thus the cable is contained in the area between the inner and outer faces of the tubular sections to resist the cable becoming released from its track.

In one arrangement the drive arrangement for causing said sliding movement of the first inner section longitudinally of the outer section to the extended position thereof comprises a drive cylinder.

However more preferably the drive arrangement for causing said sliding movement of the first inner section longitudinally of the outer section to the extended position thereof comprises a further cable and pulley arrangement symmetrical to that which elevates the second inner section including a first further pulley and a second further pulley each mounted on the outer section and a further cable arrangement connected at one end to a winch and at an opposed end to the first inner section so as to pull the first inner section to the extended position. In this arrangement preferably the further cable arrangement comprises first and second further cable lengths which are mounted at the bottom of the first inner section by a mounting member which allows transfer of loads between the first and second further cable lengths and wherein the winch is arranged to simultaneously and symmetrically pull the first and second further cable lengths.

BRIEF DESCRIPTION OF THE DRAWINGS

One embodiment of the invention will now be described in conjunction with the accompanying drawings in which:

FIG. 7 is a top plan view of the top of the mast of FIG. 1 showing two of the booms.

FIG. 8 is an isometric view of the components of FIG. 7.

In the drawings like characters of reference indicate corresponding parts in the different figures.

DETAILED DESCRIPTION

Figure 1:
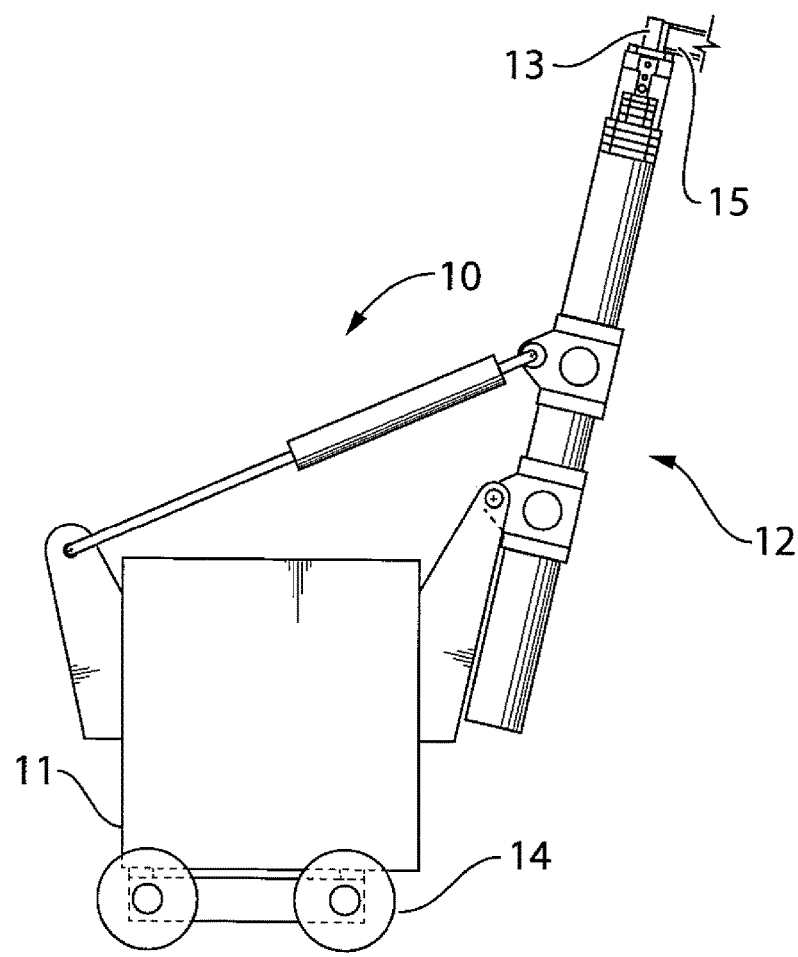
FIG. 1 is a side elevational view of a fall restraint apparatus according to the present invention showing a mast mounted on a support base in the erected position of the mast.

A fall restraint apparatus 10 comprises a support base 11, a mast 12, and a top support member 13 mounted on a top of the mast. The support base is preferably of the construction shown in U.S. Pat. No. 8,931,749 issued Jan. 13, 2015 of the present Applicant, the disclosure of which is incorporated herein by reference. In this case the base 11 may be mounted on a wheeled support or vehicle for movement to a required location, the wheeled support 14 being shown only schematically.

Figure 9:
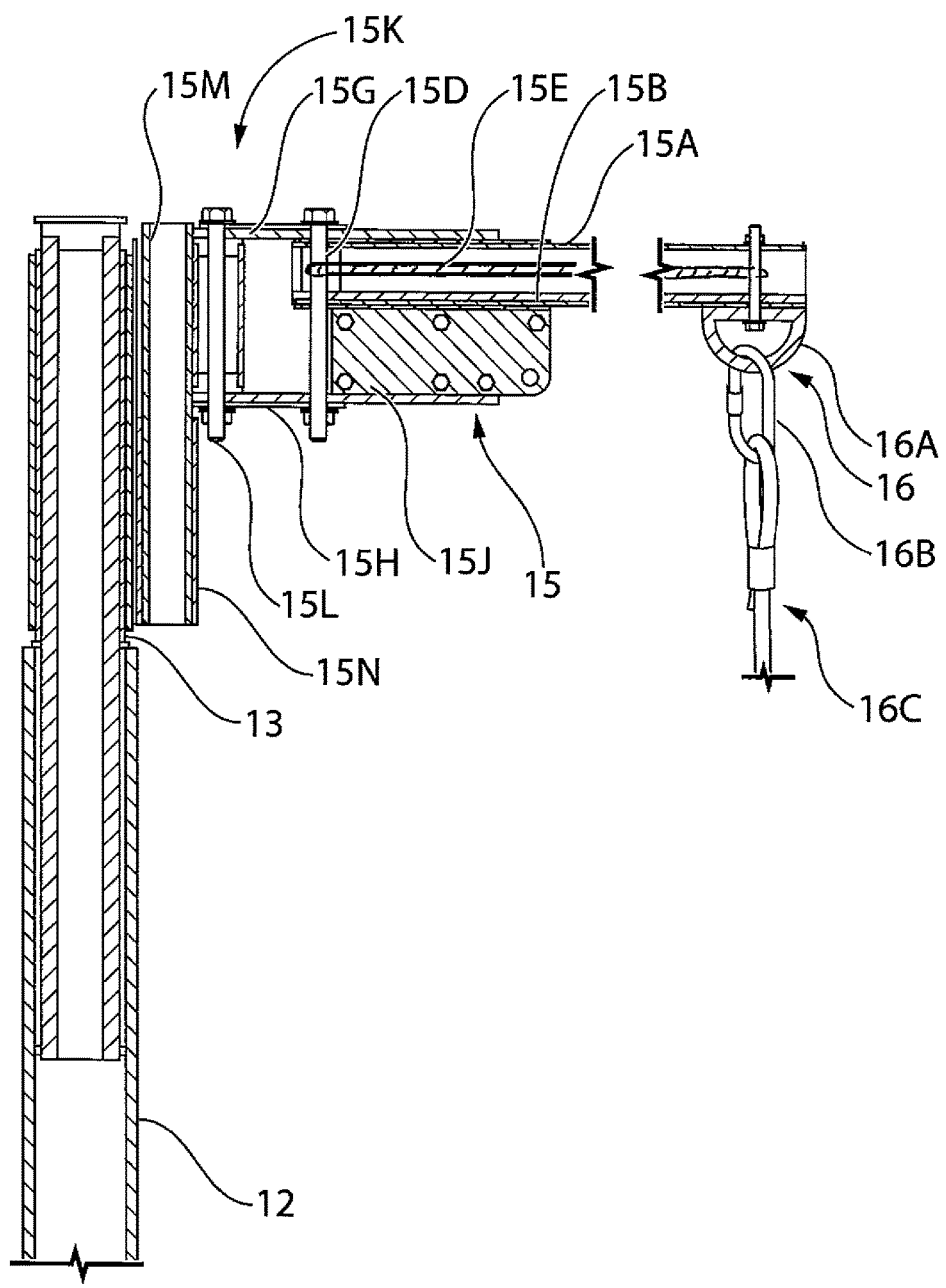
FIG. 9 is a cross-sectional view along the lines 9-9 of FIG. 8.

The support member 13 includes at least one and more typically two or four booms 15 attached to the support member 13 and extending outwardly to one side of the mast;

As shown in FIG. 9, each boom 15 includes a coupling member 16 in the form of a loop 16A attached to the boom at the outer end of the boom for receiving a fall restraint harness 16C of a worker attached by a cable 16B to the loop 16A.

Figure 2:
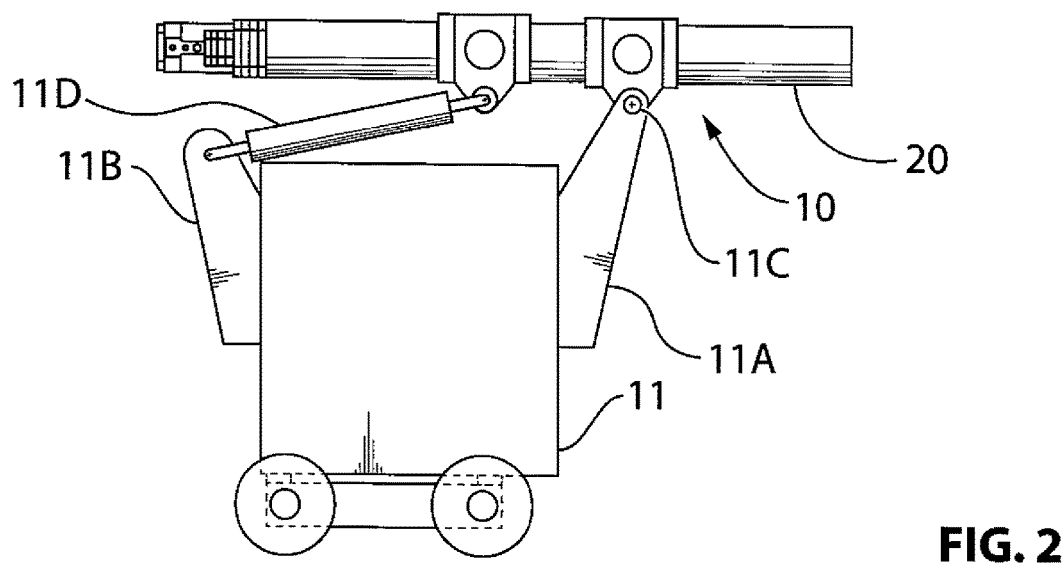
FIG. 2 is a side elevational view of the fall restraint apparatus of FIG. 1 showing the mast in the folded position of the mast.

The mast 12 is telescopic so as to extend from the collapsed position shown in FIG. 2 to the erected position shown in FIG. 1. The telescopic mast includes, as best shown in FIGS. 3 to 6, a plurality of tubular mast sections including an outer section 20, and a plurality of inner sections 21, 22 and 23. The number of inner sections can be varied to provide a required height of the mast. In the schematic illustration as shown as an example in FIGS. 5 and 6 there is provided only a first inner section 21 slidable longitudinally within the outer section 20 and a second inner section 22 slidable longitudinally within the first inner section 21. It will be appreciated that additional symmetrically mounted further sections can be provided including the third inner section 23 of FIG. 4. Each section has slide collars 24 at the ends so as to provide a bearing surface relative to the surrounding section.

Each of the sections has a rectangular cross-section so that each has first, second, third and fourth faces 21A, 21B, 21C and 21D parallel to and immediately adjacent respective first, second, third and fourth faces of each of the other sections. In this way the sections are slidable from a retracted position where the first and second inner sections are at least partly within the outer section to an extended position.

A drive arrangement 30 is provided for causing the sliding movement of the first inner section 21 longitudinally of the outer section 20 to the extended position thereof, and a cable and pulley arrangement 40 is provided for causing the movement of the first inner section 21 to the extended position to be communicated to the second inner section 22 to cause said sliding movement of the second inner section longitudinally of the first inner section to the extended position thereof. Symmetrically a second cable and pulley arrangement 50 is provided for causing the movement of the second inner section 22 to the extended position to be communicated to the third inner section 23 to cause the sliding movement of the third inner section 23 longitudinally of the second inner section 22 to the extended position thereof. The drive arrangements provided by the drive 30, the first arrangement 40 and the second arrangement 50 are separate and independent of one another rand are symmetrical.

Thus the cable and pulley arrangement 30 includes a first and a second pulley 31, 32 each mounted on the outer section 20 and a cable arrangement 33 connected at one end 33A to the outer section 20 and at an opposed end to the first inner section 21 so as to pull the first inner section 21 to the extended position. The end 33A of the cable arrangement is connected to a winch 33C and so as to pull the first inner section to the extended position. The cable lengths 33 are mounted at the bottom of the first inner section 20 by a mounting member 33D which allows transfer of loads between the first and second further cable lengths. The member 33D comprises an arcuate disk member 33E carried on the first face 21A of the first inner section for pivotal movement about an axis 33F thereof at right angles to the first face with the cable lengths 33 wrapped wound an outer periphery of the arcuate disk member. Thus unbalanced loads on the cable can be taken up by slight rotation of the disk 33E to prevent excess loading on one part of the cable which could cause breakage. Both cable lengths therefore contribute equally so that the diameter of the cable can be chosen bearing in mind that only half of the load is applied to each so that the cable can be received in the relatively narrow space between the faces 20A and 21A.

Figure 5:
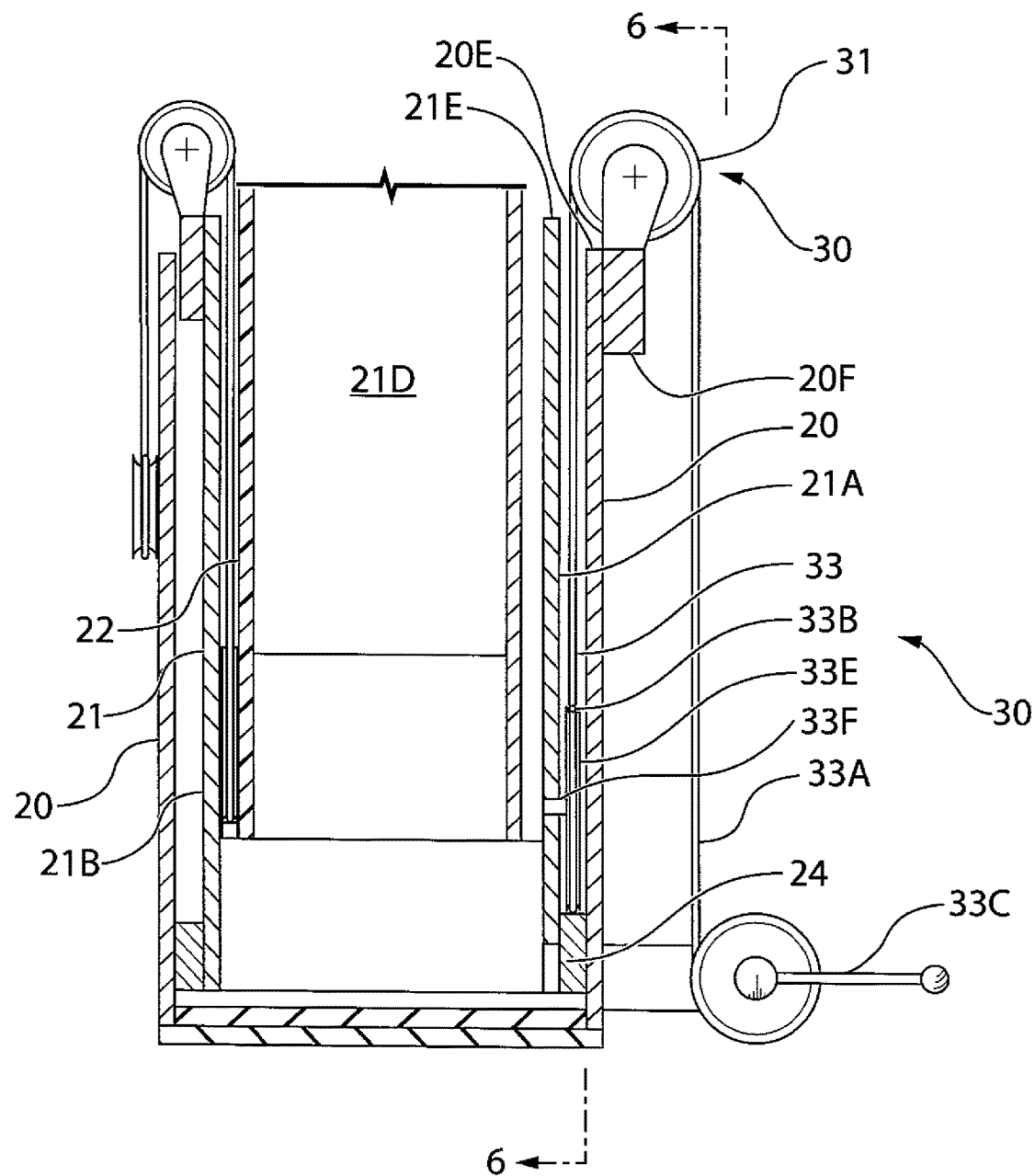
FIG. 5 is a schematic cross-sectional view similar to that of FIG. 4 with the transverse dimensions enlarged to show the construction more clearly.
Figure 6:
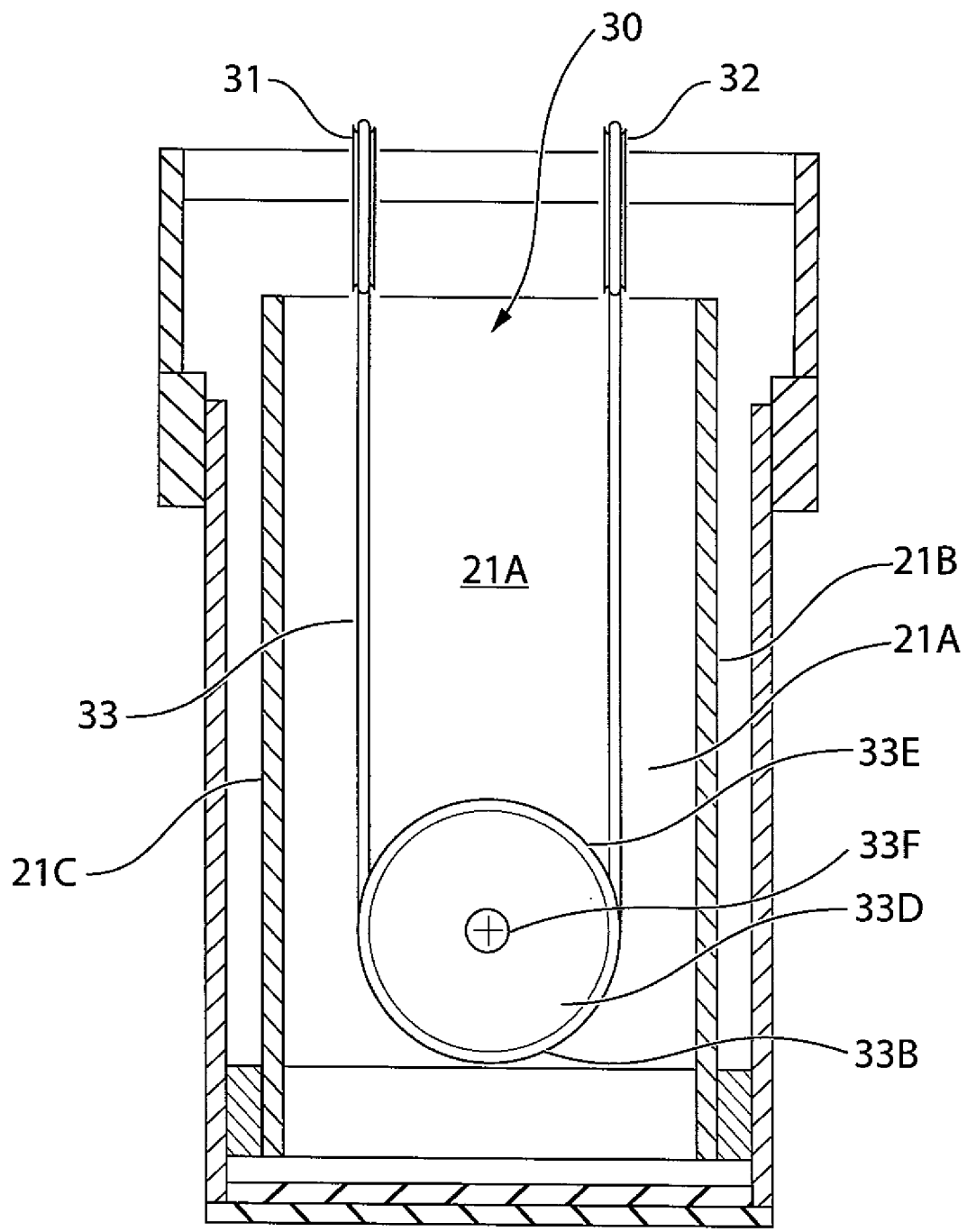
FIG. 6 is a cross-sectional view along the lines 6-6 of FIG. 5.

Also the arcuate disk member 33E is arranged to trap the cable lengths 33 to prevent escape therefrom by locating the cable in a peripheral channel and by butting that channel up against the bearing block 24 as shown in FIG. 5. Thus the cable is contained in the area between the inner and outer faces of the tubular sections to resist the cable becoming released from its track.

The winch 36C is arranged to simultaneously and symmetrically pull the first and second further cable lengths 33 so that the load from the winch acting to extend the mast is applied to both cable lengths.

The first and second pulleys 31 and 32 are mounted at the first face 20A of the outer section with the cable arrangement 33 including first and second cable lengths each wrapped around a respective one of the first and second pulleys and extending along the first face of the first inner section between the first face of the first inner section and the first face of the outer section.

The first and second pulleys 31, 32 are parallel and at right angles to the first face 21A of the first inner section 21. This allows the first and second pulleys to be mounted beyond an end 20E of the outer section 20 on a collar 20F attached to an end of the outer section.

As described above the mast is formed by a series of effectively symmetrical stages 30, 40 and 50 where the first stage comprises pulleys 31, 32 and cable 33. Symmetrically stage 40 comprises pulleys 41 and 42 and a cable 43 and stage 50 comprises pulleys 51, 52 and cable 53.

Thus there is a third inner section 23 inside the second inner section 22 and a second cable and pulley arrangement 50 for causing the movement of the second inner section 22 to the extended position to be communicated to the third inner section 23 to cause said sliding movement of the third inner section 23 longitudinally of the second inner section 22 to the extended position thereof, the second cable and pulley arrangement 50 including a third and a fourth pulley 51, 52 each mounted on the second inner section 22 and a cable arrangement connected at one end to the first inner section and at an opposed end to the third inner section 23 so as to pull the third inner section 2 to the extended position as the second inner section moves out of the first inner section.

The third and fourth pulleys 41, 42 are mounted at the third face 22C of the second inner section 22. Thus the third and fourth pulleys 41, 42 are mounted on a side of the mast opposite to the first and second pulleys and on an opposite side to the pulleys 51 and 52 so that the construction can collapse to a reduce length since the pulleys do not sit one on top of the next. Symmetrically the pulleys of further sections or of the outer section can be arranged at alternate sides of the mast to allow better interleaving of the structure when collapsed. Also as the transverse dimension of the sections reduces, the pulleys are closer together so that again there is more room to bring the height down in the collapsed condition.

In one arrangement the drive arrangement for causing said sliding movement of the first inner section longitudinally of the outer section to the extended position thereof comprises a drive cylinder.

Turning now to FIGS. 8, 9 and 10, the boom 15 includes an outer tube 15A attached to the support member 13 at an inner end and attached to the coupling member 16 at an outer end. The tube is formed of aluminum or similar material so that it provides structural strength to stand out to the side of the mast but is arranged so that it fractures on application of a load applied by a fall to the coupling member causing bending of the tube.

In order to provide structural integrity and continued connection from the mast to the coupling 16 in the event of a fall causing fracturing of the tube as it bends beyond an allowable angle, there is also provide an internal elongate member in the form of a flat strap 15B located inside the tube and attached to the support member at the inner end and attached to the coupling member at the outer end. The elongate member 15B is formed of a flexible metal such as stainless steel which is arranged so that it bends without fracturing on fracture of the tube. The elongate member in the form of a flat solid strap of metal has a width substantially equal to a transverse interior width of the tube. Stainless steel which has the ability to bend with predetermined characteristics without the risk of fracture. In this way the tube can be designed to fracture under the load and therefore the boom collapses inwardly toward the mast so that the distance of the coupling to which the harness is attached from the mast reduces to reduce the side load on the mast caused by the fall. In this way total loading on the mast can be reduced so that the dimensions of the mast and the support for the mast can be reduced.

The tube 15A is of rectangular cross-section and the flat strap is located in the tube at a bottom wall of the tube.

It is of course necessary that the elongate member in the form of the strap remains connected to the mast at the inner end and to the coupling at the outer end to maintain continuity when the tube fractures. Thus the tube and strap are simultaneously fastened to the support member by a pin 15D passing through transverse holes in the tube and the strap. In order to maintain this continuity, an additional wire cable 15E may be attached along the tube on the exterior or on the interior so that in effect the cable from the harness to the coupling is continued right up to the mast by the additional cable 15E. There is therefore no danger of the harness being disconnected from the mast on the shock loading from a fall even though the worker will fall an additional distance defined by the length of the boom as the boom collapses.

The pin 15D is carried on a top and bottom plate 15G, 15H strengthened by a gusset 15J between the tube and the bottom plate 15H. The plates 15G and 15H connect to a swivel coupling 15K which allows the boom to swivel in a horizontal plane but an axis parallel to the mast through a limited angle of the order of 70 degrees. The swivel coupling 15K is attached to a vertical tube 15M carried in a sleeve 15N. The sleeve 15N is attached on one side of the support member 13. Thus the support member 13 is removable as a whole from the top of the mast by sliding out of the top section. Also the support member provides a number, typically two or four of the sleeves 15N for receiving the pin 15M of the selected number of booms.

Figure 3:
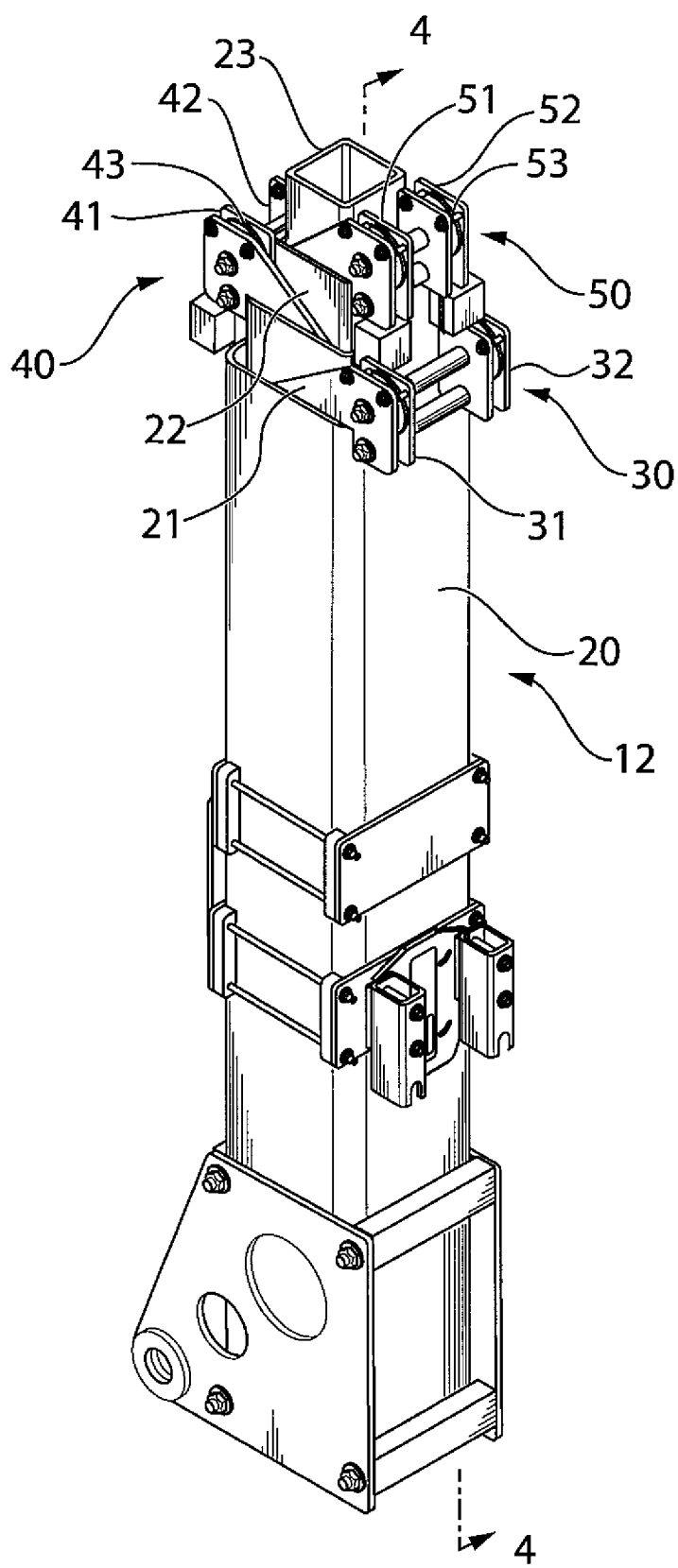
FIG. 3 is an isometric view of the mast of FIG. 1.
Figure 4:
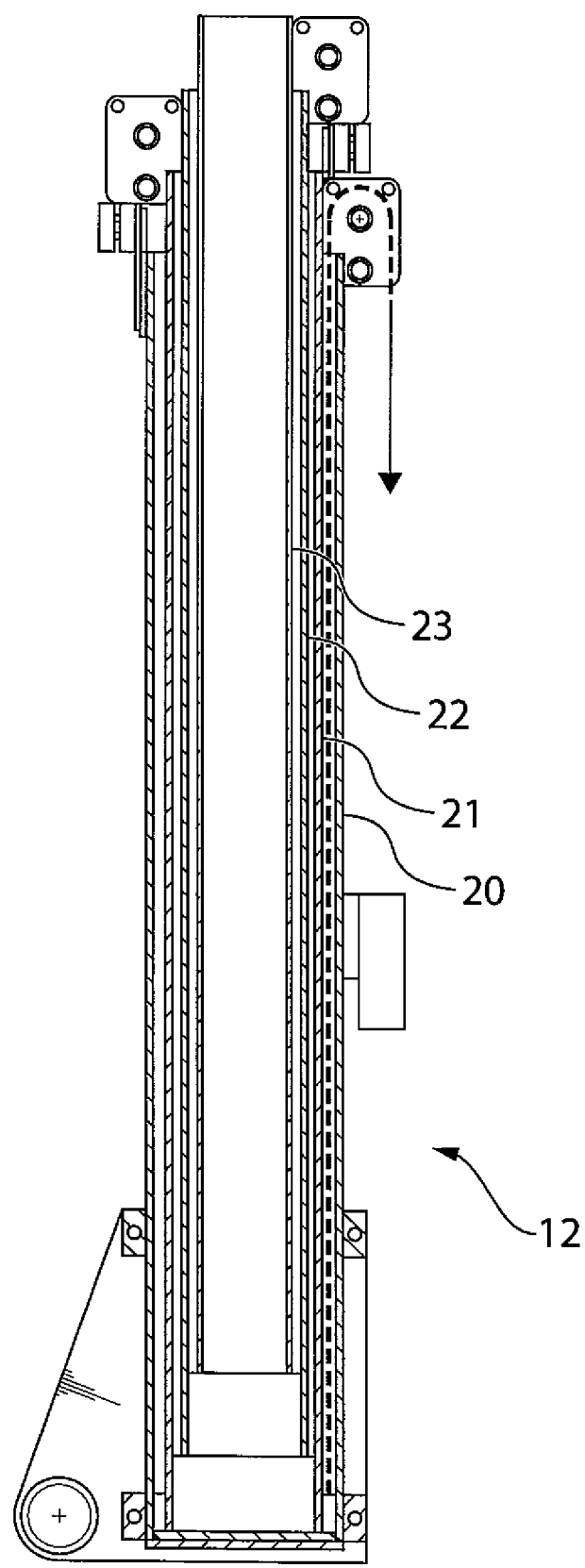
FIG. 4 is a cross-sectional view along the lines 4-4 of FIG. 3 of the mast of FIG. 1.

Turning again to FIG. 1, there is provided a first bracket member 11A attaching the outer section 20 of the mast to the support base 11 for pivotal movement about a horizontal axis at pivot pin 11C transverse to the mast and an actuator 11D attached to the support base at a bracket 11B on the opposite side of the base 11 for moving the mast between a horizontal stored position shown in FIG. 2 across the support base to an erected position shown in FIG. 3 standing upwardly from the support base.

The support base comprises a rectangular body filled with a ballast material and comprising an outer metal wall connected to the brackets for transferring the loads from the mast into the support base. The fact that the boom is collapsible reduces the side loading on the mast so that the support base can hold the mast vertical without toppling and without breakage of any of the coupling components.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A fall protection apparatus comprising:
   a support base;
   a telescopic mast comprising:
      a plurality of tubular mast sections including an outer section, a first inner section slidable longitudinally within the outer section and at least one further section slidable longitudinally within the first inner section;
      the sections being slidable from a retracted position where the first inner section and further sections are at least partly within the outer section to an extended position;
      a drive arrangement for driving said sliding movement of the first inner section and said at least one further section longitudinally of the outer section to the extended position thereof;

a top support member mounted on a top of the mast a plurality of booms each carried on the support member and extending outwardly to one side of the mast;

each of the plurality of booms including a respective attachment member at the end of the respective boom for receiving a fall restraint harness of a worker;

wherein the top support member includes an elongate mounting member inserted into a top end of the mast;

wherein the elongate mounting member carries a plurality of upstanding receptacles at spaced positions therearound each for receiving a respective insert member of a respective one of a plurality of booms;

and wherein each boom of said plurality of booms includes a respective swivel coupling for limited side to side pivotal movement of the respective boom relative to the elongate mounting member about an axis parallel to an upstanding axis of the mast.

2. A fall protection apparatus comprising:

a support base;

a telescopic mast comprising:

a plurality of tubular mast sections including an outer section, a first inner section slidable longitudinally within the outer section and at least one further section slidable longitudinally within the first inner section;

the sections being slidable from a retracted position where the first inner section and further sections are at least partly within the outer section to an extended position;

a drive arrangement for driving said sliding movement of the first inner section and said at least one further section longitudinally of the outer section to the extended position thereof;

a top support member mounted on a top of the mast;

at least one boom carried on the support member and extending outwardly to one side of the mast;

and an attachment at the end of the boom for receiving a fall restraint harness of a worker;

wherein the support base comprises a rectangular body at least partly filled with a ballast material;

wherein the support base comprises first and second opposed upstanding metal walls;

a first bracket member mounted on the first upstanding metal wall attaching the outer section of the mast to the support base for pivotal movement about a horizontal axis transverse to the mast;

an actuator attached to the support base for moving the mast between a horizontal stored position across a top of the support base to an erected position standing upwardly from the support base;

and a second bracket member mounted on the second upstanding metal wall attaching the actuator to the support base.

3. The apparatus according to claim 2 wherein the support base is mounted on ground wheels for movement to a required location.

4. The apparatus according to claim 1 wherein the support base comprises a rectangular body at least partly filled with a ballast material, wherein the support base comprises first and second opposed upstanding metal walls, wherein a first bracket member is mounted on the first upstanding metal wall attaching the outer section of the mast to the support base for pivotal movement about a horizontal axis transverse to the mast, wherein there is provided an actuator attached to the support base for moving the mast between a horizontal stored position across a top of the support base to an erected position standing upwardly from the support base and wherein there is provided a second bracket member mounted on the second upstanding metal wall attaching the actuator to the support base.

5. The apparatus according to claim 1 wherein the top support member is rotatable about an upstanding axis of the mast.

6. The apparatus according to claim 1 wherein the top support member is removable.

7. The apparatus according to claim 1 wherein each of the plurality of booms is cantilevered by the top support member so as to support the respective attachment member at a predetermined distance from the top support member and such that the force on the boom acts to apply a bending force to the boom relative to the top support member in the direction transverse to the boom and wherein said at least one boom includes a shock absorbing arrangement where at least a part of the boom fractures allowing bending of the boom causing the distance of the attachment member from the top support member to be reduced from said predetermined distance.

8. The apparatus according to claim 7 wherein the boom comprise first and second elongate members so as to support the bending force substantially without bending up to a predetermined maximum value and, when the maximum value is exceeded, the first elongate member fractures so as to no longer support the bending force, the second elongate member being arranged so that the second elongate member bends without fracturing on fracture of the first elongate member, the second elongate member, when the first elongate member is fractured, acting to connect the attachment member to the top support member so as hold the attachment member and the load attached thereto from disconnection from the top support member, the first and second elongate members by the fracture of the first elongate member and the bending of the second elongate member causing the distance of the coupling member from the support member to be reduced from said predetermined distance.

9. The apparatus according to claim 8 wherein the first and second elongate members lie immediately adjacent with the first elongate member at least partly surrounding the second elongate member.

10. The apparatus according to claim 9 wherein the first elongate member is a tube and the second elongate member is located inside the tube.

11. The apparatus according to claim 10 wherein the second elongate member comprises a strap having a width substantially equal to a transverse interior width of the first elongate member.

12. The apparatus according to claim 2 wherein said at least one boom is cantilevered by the top support member so as to support the respective attachment member at a predetermined distance from the top support member and such that the force on the boom acts to apply a bending force to the boom relative to the top support member in the direction transverse to the boom and wherein said at least one boom includes a shock absorbing arrangement where at least a part of the boom fractures allowing bending of the boom causing the distance of the attachment member from the top support member to be reduced from said predetermined distance.

13. The apparatus according to claim 12 wherein said at least one boom comprises first and second elongate members so as to support the bending force substantially without bending up to a predetermined maximum value and, when the maximum value is exceeded, the first elongate member fractures so as to no longer support the bending force, the second elongate member being arranged so that the second elongate member bends without fracturing on fracture of the first elongate member, the second elongate member, when the first elongate member is fractured, acting to connect the attachment member to the top support member so as hold the attachment member and the load attached thereto from disconnection from the top support member, the first and second elongate members by the fracture of the first elongate member and the bending of the second elongate member causing the distance of the coupling member from the support member to be reduced from said predetermined distance.

14. The apparatus according to claim 13 wherein the first and second elongate members lie immediately adjacent with the first elongate member at least partly surrounding the second elongate member.

15. The apparatus according to claim 14 wherein the first elongate member is a tube and the second elongate member is located inside the tube.

16. The apparatus according to claim 15 wherein the second elongate member comprises a strap having a width substantially equal to a transverse interior width of the first elongate member.

17. A fall protection apparatus comprising:
- a support base mounted on a support vehicle including ground wheels for movement of the support base to required locations;
- a telescopic mast comprising a plurality of tubular mast sections mounted one inside the next for telescopic sliding movement and a drive system for driving said sliding movement of the mast sections to an extended position, the drive system including at least one cable interconnection such that movement of one of the mast sections is communicated to another of the mast sections through the cable interconnection;
- a top support member mounted on a top of the mast;
- a plurality of booms each carried on the top support member and extending outwardly to a respective side of the mast so that the booms are angularly spaced around a longitudinal axis of the mast;
- each of the plurality of booms including a respective attachment at the end of the respective boom for receiving a fall restraint harness of a worker;
- wherein each boom of said plurality of booms includes a respective swivel coupling for limited side to side pivotal movement of the respective boom relative to the top support member and therefore relative to each other.

18. The apparatus according to claim 17 wherein each of the plurality of booms is cantilevered by the top support member so as to support the respective attachment member at a predetermined distance from the top support member and such that the force on the boom acts to apply a bending force to the boom relative to the top support member in the direction transverse to the boom and wherein said at least one boom includes a shock absorbing arrangement where at least a part of the boom fractures allowing bending of the boom causing the distance of the attachment member from the top support member to be reduced from said predetermined distance.

19. The apparatus according to claim 18 wherein the boom comprise first and second elongate members so as to support the bending force substantially without bending up to a predetermined maximum value and, when the maximum value is exceeded, the first elongate member fractures so as to no longer support the bending force, the second elongate member being arranged so that the second elongate member bends without fracturing on fracture of the first elongate member, the second elongate member, when the first elongate member is fractured, acting to connect the attachment member to the top support member so as hold the attachment member and the load attached thereto from disconnection from the top support member, the first and second elongate members by the fracture of the first elongate member and the bending of the second elongate member causing the distance of the coupling member from the support member to be reduced from said predetermined distance.

20. The apparatus according to claim 19 wherein the first and second elongate members lie immediately adjacent with the first elongate member at least partly surrounding the second elongate member.

21. The apparatus according to claim 20 wherein the first elongate member is a tube and the second elongate member is located inside the tube.

22. The apparatus according to claim 21 wherein the second elongate member comprises a strap having a width substantially equal to a transverse interior width of the first elongate member.

* * * * *